US008322369B2

(12) United States Patent
Schmidt et al.

(10) Patent No.: US 8,322,369 B2
(45) Date of Patent: Dec. 4, 2012

(54) DAMPING VALVE FOR A HYDRAULIC SHOCK ABSORBER

(75) Inventors: Klaus Schmidt, Odenthal (DE); Wolfgang Hamers, Juelich (DE)

(73) Assignee: Thyssenkrupp Bilstein Suspension GmbH, Ennepetal (DE)

( * ) Notice: Subject to any disclaimer, the term of this patent is extended or adjusted under 35 U.S.C. 154(b) by 403 days.

(21) Appl. No.: 12/404,760

(22) Filed: May 27, 2009

(65) Prior Publication Data

US 2009/0283706 A1  Nov. 19, 2009

(30) Foreign Application Priority Data

Mar. 20, 2008  (DE) .......................... 10 2008 015 416

(51) Int. Cl.
*F16K 1/30* (2006.01)
(52) U.S. Cl. ...................... 137/614.2; 251/122; 251/205
(58) Field of Classification Search ............... 137/614.2; 251/122, 205; 188/313, 322.2
See application file for complete search history.

(56) References Cited

U.S. PATENT DOCUMENTS

| 828,091 | A | * | 8/1906 | Crane | 188/313 |
| 831,615 | A | * | 9/1906 | Lammert | 188/313 |
| 1,065,494 | A | * | 6/1913 | Andersen et al. | 251/205 |
| 1,919,955 | A | * | 7/1933 | Leech et al. | 251/205 |
| 6,293,514 | B1 | * | 9/2001 | Pechoux et al. | 251/122 |
| 6,607,175 | B1 | * | 8/2003 | Nguyen et al. | 251/205 |
| 2005/0121273 | A1 | | 6/2005 | Hamers | 188/322.2 |
| 2009/0224190 | A1 | * | 9/2009 | Dale et al. | 251/205 |
| 2011/0042174 | A1 | * | 2/2011 | Hamers et al. | 188/322.13 |

FOREIGN PATENT DOCUMENTS

DE      3937795      * 11/1990

OTHER PUBLICATIONS

Eurpoean Patent Office, DE3937795, machine translation, Jun. 15, 2011.*

\* cited by examiner

*Primary Examiner* — Kevin Lee
*Assistant Examiner* — Craig J Price
(74) *Attorney, Agent, or Firm* — Andrew Wilford

(57) ABSTRACT

A flow-control valve has a housing, a guide fixed in the housing and having a tubular end and formed with a radially throughgoing heart-shaped valve opening, and a slide axially shiftable in the housing and having a shaft and a sleeve extending axially from the shaft and snugly surrounding and slidable on the guide-body end. The slide is axially shiftable between positions with the sleeve completely blocking, partially blocking, and completely unblocking the valve opening. An electromagnetic linear actuator in the housing can axially shift the slide. A support ring fixed to the actuator and to the guide forms with the guide-body end an annular chamber into which the valve opening opens and is formed with a radially throughgoing port opening into the chamber and radially aligned with the valve opening.

7 Claims, 3 Drawing Sheets

DAMPING VALVE FOR A HYDRAULIC SHOCK ABSORBER

FIELD OF THE INVENTION

The invention relates to a flow-control valve for a hydraulic shock absorber with
- an axially movable slide having a body and a valve sleeve,
- an electromagnetic linear actuator for axial displacement of the slide,
- a fixed guide, which is configured as a tube and has an end pin, and
- a support ring between fixed parts of the linear actuator and the guide.

the valve sleeve being guided on the end pin of the guide and cooperating with at least one valve opening formed in the wall of the guide such that the flow cross section of the valve opening can be altered by axial movement of the sleeve, and the guide and the support ring define an annular chamber into which valve openings of the guide and flow ports in the wall of the support ring open. The flow-control valve can be provided in a housing having a flow inlet and a flow outlet and can be attached as a so-called "backpack valve" on the outside of a hydraulic shock absorber. The flow inlet and outlet of the housing are connected hydraulically to compartments of the shock absorber. When the slide is actuated the damping force of the hydraulic shock absorber can be changed steplessly. If two flow-control valves are assigned to one shock absorber it is then possible to independently control the damping forces in during compression and extension of the shock absorber.

BACKGROUND OF THE INVENTION

A flow-control valve of the above-described type is known from EP 1 538 366 The support ring spacedly surrounds the slide. As a result there is between the slide and the support ring there is an annular chamber that is called because of its standard use the output chamber. EP 1 538 366 describes how the annular chamber is necessary to be able to influence the flow of the damping liquid and thus also the damping force of the flow-control valve in a targeted way. The flow of the damping liquid may be influenced by the height and width of the annular chamber and by the size and number of the openings formed in the wall of the support ring so that one flow component immediately leaves the annular flow chamber through the outflow ports, while the remaining flow component is diverted into the chamber and guided to a front face of the slide. The diverted flow component in the annular chamber is necessary for the compensation of interfering forces. In general, this publication provides one skilled in the art with the additional idea of influencing the flow resistance on the wall of the guide by the shape of the valve openings. In spite of the parameters to be maintained according to the prevailing teaching, the damping force curve is still unsatisfactory if the known flow-control valve is used. This relates to both the damping force curves dependent on the flow and also reproducibility.

OBJECT OF THE INVENTION

The object of the invention is to improve the damping characteristics of a flow-control valve.

SUMMARY OF THE INVENTION

Proceeding from a flow-control valve having the features described at the beginning, the object is achieved according to the invention in that the valve openings of the guide are heart-shaped and extend from a point in the closing direction of the slide symmetrically to an axis of symmetry through the point, first as curves and then as flat regions to a wide opening, the ports each being aligned on the respective axis of symmetry with a respective opening of the sleeve. The invention is based on the surprising finding that flow deflection is to be avoided in the annular flow chamber between the guide and the support ring and better flow behavior of the flow-control valve is ensured if the valve openings and the ports of the support ring associated with the valve openings are aligned and if the damping fluid flows through the annular flow chamber essentially radially without any deflection. It has proven to be favorable if, contrary to the prevailing opinion of the teaching, the flow pressure loss essentially only occurs at the boundary of the valve openings and pressure losses that occur in the flow in the annular chamber and on the flow out through the ports, are negligibly small in relation thereto in every functional position of the slider. The ports in the support ring are preferably implemented as bores.

The shaft of the slide advantageously has at least one pressure-compensation passage in a way known per se that hydraulically interconnects the fluid compartment inside the valve sleeve and a fluid compartment on the rear face of the shaft. According to the invention, an opening is situated in the cylindrical wall of the sleeve that hydraulically connects the fluid compartment inside the sleeve to the annular flow chamber between the support ring and the sleeve in every functional position of the slide. In order that the sleeve can be shifted precisely using little force independently of the damping fluid flowing through the valve openings, it has been proven to be advantageous if the wall thickness of the sleeve tapers toward the front end of the sleeve to form a front sealing edge. The sealing face may be shaped as a flat annular face that is 0.1 mm wide, for example.

In a further advantageous embodiment of the flow-control valve according to the invention, a check valve is provided in the guide only permitting one-way flow. The check valve may be fastened to a cover provided with intake ports and anchorable to the guide.

The design of the mounting and guiding of the axially movable slide also has an effect on the precision with which the slide may be adjusted and positioned repeatedly under identical conditions. An embodiment of the invention that is advantageous in this regard provides that the support ring is fixed without play on complementary faces of the guide and has on its end facing away from the fixation point a cylindrical extension that surrounds the shaft and extends up into the area of the linear actuator, a bearing ring being situated on the cylindrical extension that surrounds the shaft with slight play to permit axial movement of the slide. The bearing and the shaft that guided so it can slide in the bearing are preferably dimensioned to a tight clearance fit, while a transition or press fit is advantageous for mounting the support ring on the guide.

BRIEF DESCRIPTION OF THE DRAWING

The invention will now be explained below by means of embodiments, in which.

DETAILED DESCRIPTION

Figure 1:
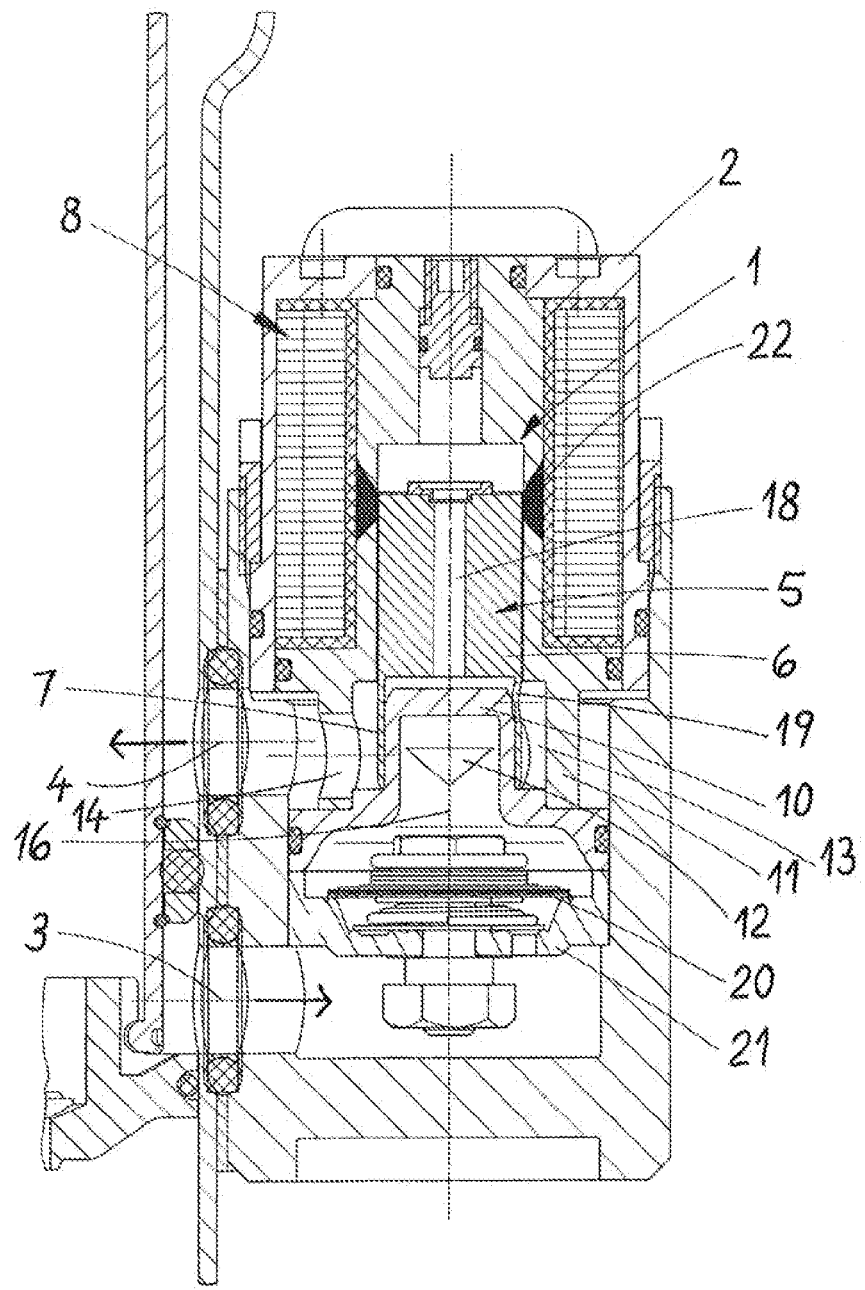
FIG. 1 schematically illustrates a longitudinal section through a flow-control valve for a hydraulic shock absorber.

The flow-control valve 1 shown in FIG. 1 is provided in a housing 2 having an inlet port 3 and an outlet port 4 for connecting to a hydraulic shock absorber. The housing 2 can have any shape.

Figure 2:
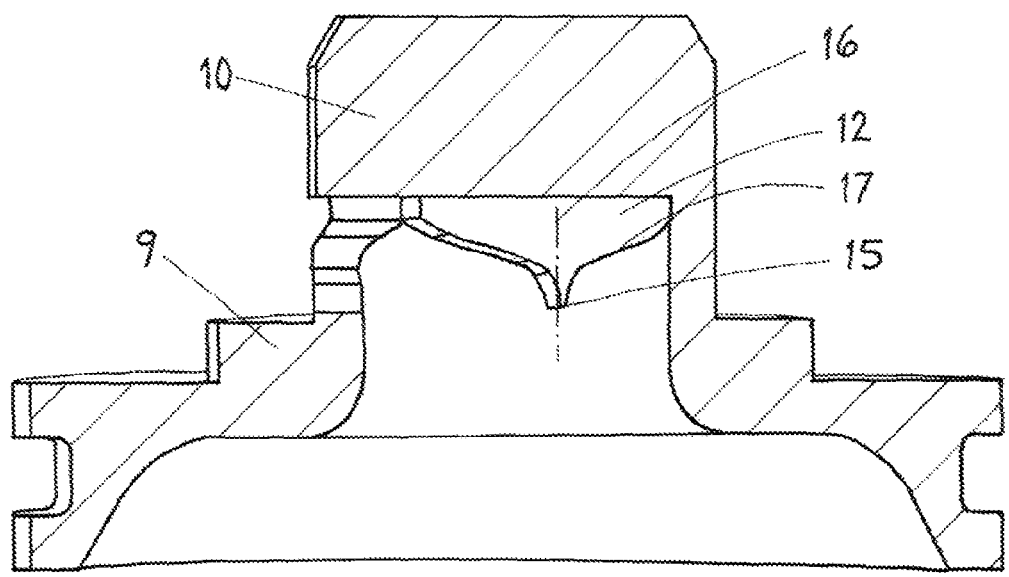
FIG. 2 is a perspective view in larger scale than FIG. 1 showing the shape of a flow port in a support ring, FIG. 3 schematically illustrates an arrangement with two flow-control valves which are provided in a common housing and can be inserted to alter the damping forces in the expansion and compression strokes of the shock absorber independently of one another.

The basic construction of the flow-control valve 1 shown in FIG. 1 includes an axially movable slide 5 that is preferably of one piece and comprises a shaft 6 and a valve sleeve 7, an electromagnetic linear actuator 8 for the axial adjustment of the slide 5, a tubular fixed guide 9 comprising a pin-shaped end 10 and a support ring 11 between fixed parts of the linear actuator 8 and the guide 9. The valve sleeve 7 is guided on the pin-shaped end 10 of the guide 9 and works together with valve openings 12 in the wall of the guide 9 in such a way that the free flow cross section of the valve openings 12 is determined by the axial position of the slide 5. The guide 9 and the support ring 11 surrounding it define an annular flow chamber 13 into which the valve openings 12 of the guide 9 and ports 14 in the wall of the support ring 11 open. It is clear from FIGS. 1 and 2 that the valve openings 12 of the guide 9 are heart-shaped, extending from a point 15 first as arcs and then as straight edges 17 diverging in the closing direction of the slide, symmetrical to an axis of symmetry 16 extending through the point 15, and ending at a wide edge. The flatly rising edges 17 may be curved linearly or arced. Furthermore, it is essential according to the invention that the ports 14 are each aligned with the axis of symmetry 16 of a respective valve opening 12 of the guide 9.

The flow cross-section of the ports 14 is advantageously greater than the flow cross-section of the respective valve openings 12. Furthermore, it may be seen from the figures that the ports 14 are shaped as bores.

The shaft 6 of the slide 5 has at least one pressure compensation passage 18 that hydraulically connects a fluid compartment inside the valve sleeve 7 to a fluid compartment on the rear face of the shaft 6. At least one opening 19 is formed in the cylindrical wall of the valve sleeve 7 that connects the fluid compartment inside the sleeve 7 to the annular flow chamber 13 between the support ring and the guide in every functional position of the slide 5. The wall thickness of the sleeve 7 advantageously tapers toward the front end of the sleeve to form a frontal sealing edge. The sealing edge is preferably a flat annular face, which may have a width of 0.1 mm, for example.

In the illustrated embodiment, a check valve 20 permitting flow only one direction is provided in the guide 9. Typically, flow is first through the check valve 20 and subsequently through the openings 12 in the guide 9 and in the support ring 11. However, another flow direction is not to be precluded. The damping element 20 is situated on a cover 21 provided with intake ports and anchorable on the guide 9.

In the illustrated embodiment, the support ring 11 is fixed without play on complementary faces of the guide 9 and has on its end facing away from where it is anchored a cylindrical extension that surrounds the shaft 6 of the slide and extends up into the linear actuator 8. A bearing ring 22 is carried on the cylindrical extension and surrounds the shaft 6 with slight play that permits axial sliding movement of the slide 5.

Figure 3:
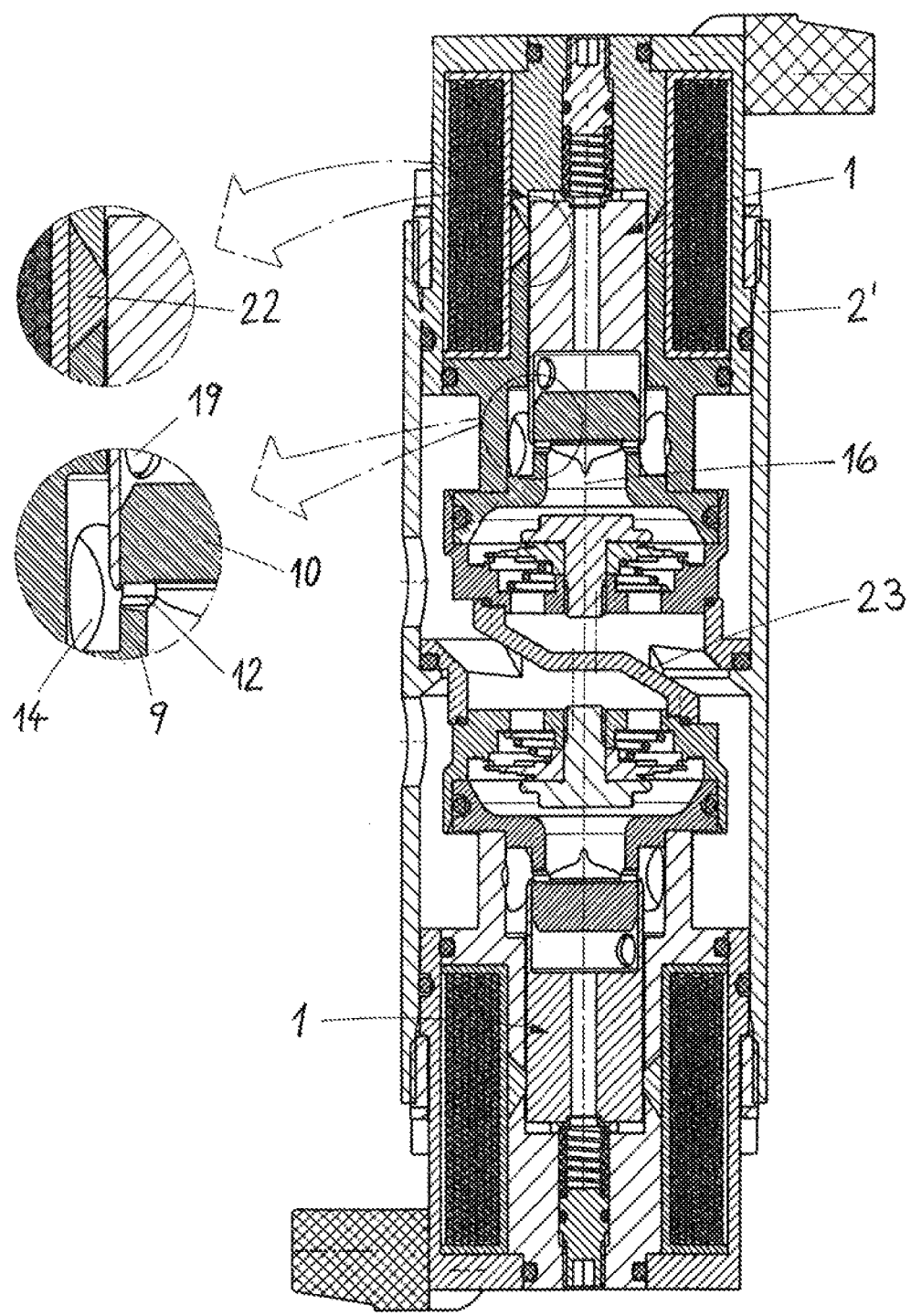

In the illustrated embodiment shown in FIG. 3, two flow-control valves 1 according to the invention are situated in a shared housing 2' that has an inlet port 3 and an outlet port 4.

A flow guide 23 is provided inside the housing 2' that separates two hydraulic chambers of the housing from one another in such a way that the damping liquid, which flows into the first hydraulic chamber during a retraction movement of the piston rod, is fed to the first flow-control valve in the valve flow-through direction, and the damping liquid, which flows into the second hydraulic chamber during an extension movement of the piston rod, is fed to the second flow-control valve in the valve flow-through direction.

The invention claimed is:

1. In combination with a hydraulic shock absorber having two compartments, a flow-control valve comprising:
    a housing having a flow inlet connected to one of the compartments and a flow outlet connected to the other of the compartments;
    a guide fixed in the housing and having a tubular end centered on an axis, into which the flow inlet opens, and formed with a radially throughgoing heart-shaped valve opening having a point and a pair of edges flaring symmetrically away from the point to a wide opposite end;
    a slide axially shiftable in the housing and having a shaft and a sleeve extending axially from the shaft and snugly surrounding and slidable on the guide end, the slide being axially shiftable between positions with the sleeve completely blocking, partially blocking, and completely unblocking the valve opening;
    an electromagnetic linear actuator in the housing for axially shifting the slide;
    a support ring fixed to the actuator and to the guide, forming with the guide end an inner annular chamber into which the valve opening opens, forming with the housing an outer annular chamber into which the outlet port opens, and formed between the chambers with a radially throughgoing port radially aligned with the valve opening, the support ring being fixed without play on complementary faces of the guide and having a cylindrical extension on its end facing away from where it is anchored that surrounds the shaft and extending up to the linear actuator; and
    a bearing ring on the cylindrical extension and surrounding the shaft with play to permit axial movement of the slide.

2. The flow-control valve defined in claim 1 wherein a flow cross section of the port of the support ring is larger than a flow cross section of the valve opening of the guide.

3. The flow-control valve defined in claim 1 wherein the port is a cylindrical bore.

4. The flow-control valve defined in claim 1 wherein the slide forms a front compartment between an end face of the shaft and a confronting end face of the guide end and a back compartment between a back face of the shaft and the housing, the shaft being formed with an axially throughgoing pressure-compensation passage extending between the front and back compartments, the sleeve being formed adjacent the shaft with a radially throughgoing hole opening in all axial positions of the slide into the front compartment and into the inner annular chamber.

5. The flow-control valve defined in claim 1 wherein a wall thickness of the sleeve decreases axially away from the shaft.

6. The flow-control valve defined in claim 5 wherein the sleeve has a front edge with a thickness of about 0.1 mm.

7. The flow-control valve defined in claim 1, further comprising:
    a check valve on the guide body between the flow inlet and an interior of the guide end.

\* \* \* \* \*